J. W. ROSCHE.
HYDRAULIC TRANSMISSION MECHANISM.
APPLICATION FILED APR. 20, 1916.
1,343,338.
Patented June 15, 1920.
3 SHEETS—SHEET 1.
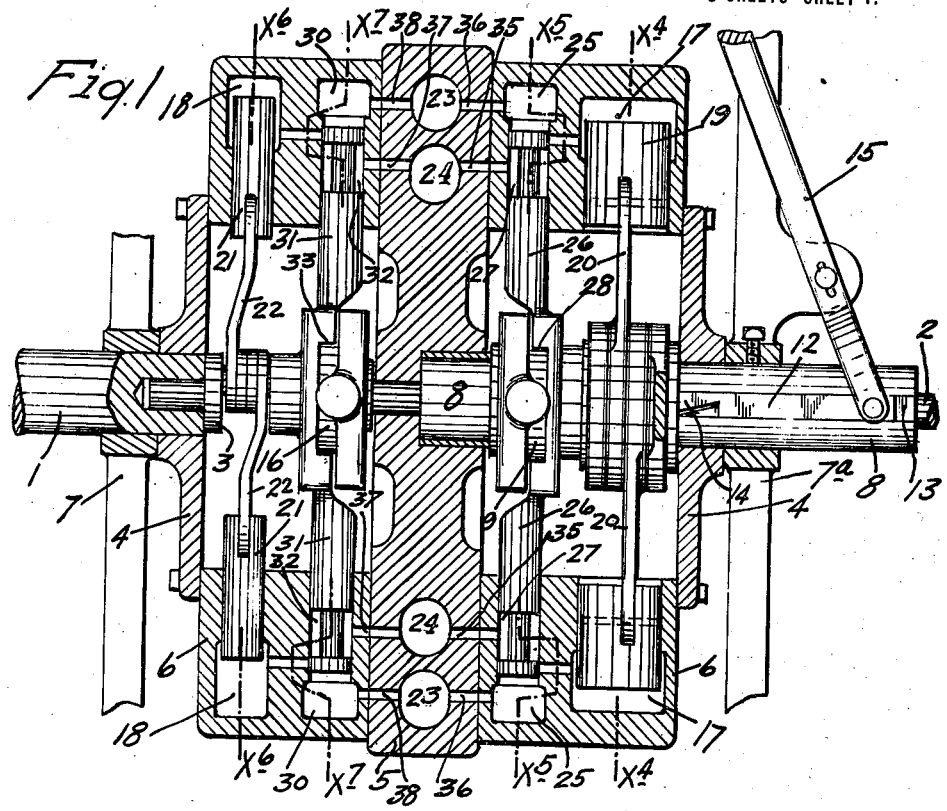
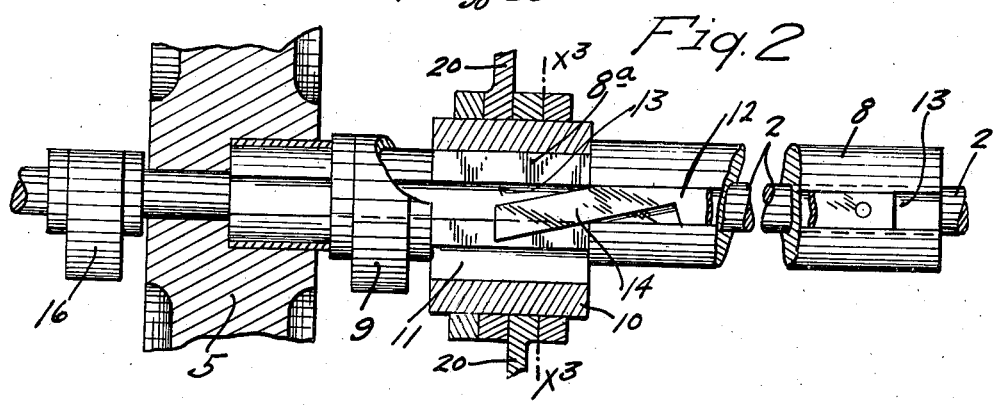
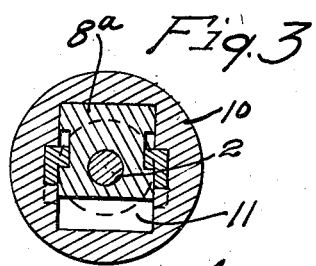
WITNESSES
E. C. Wells
A. H. Opsahl
INVENTOR
Joseph W. Rosche
BY HIS ATTORNEYS

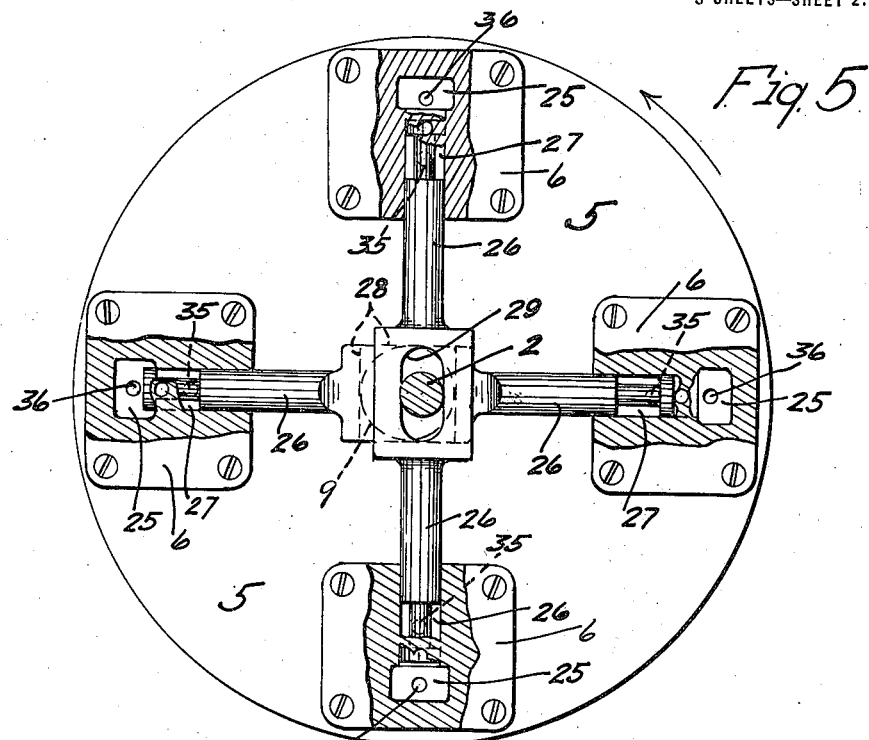
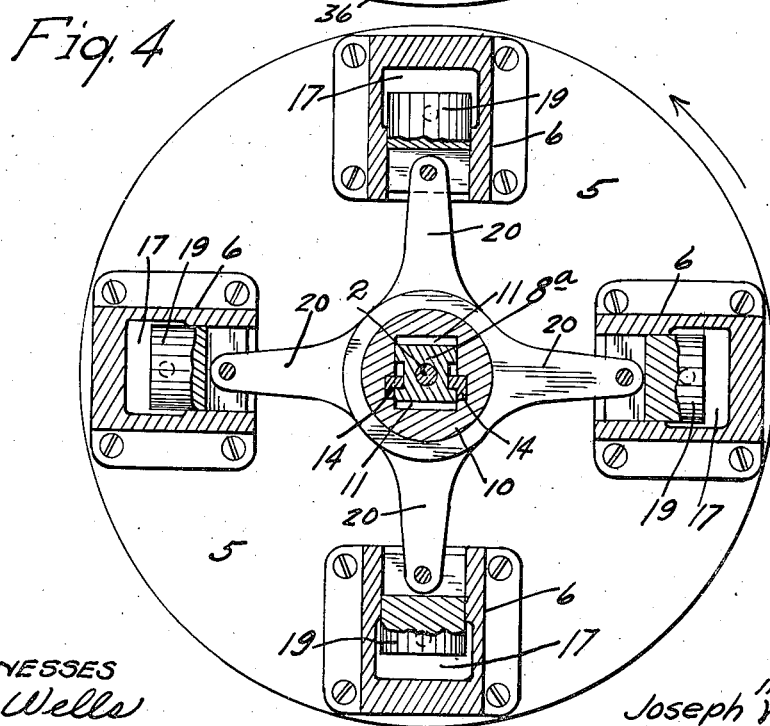

J. W. ROSCHE.
HYDRAULIC TRANSMISSION MECHANISM.
APPLICATION FILED APR. 20, 1916.

1,343,338. Patented June 15, 1920.
3 SHEETS—SHEET 3.

WITNESSES
E. E. Wells
A. H. Opsahl

INVENTOR
Joseph W. Rosche
BY HIS ATTORNEYS
Williamson & Merchant

UNITED STATES PATENT OFFICE.

JOSEPH W. ROSCHE, OF MINNEAPOLIS, MINNESOTA, ASSIGNOR TO THE ROSCHE FLUID TRANSMISSION COMPANY, OF MINNEAPOLIS, MINNESOTA, A CORPORATION OF MINNESOTA.

HYDRAULIC TRANSMISSION MECHANISM.

1,343,338.  Specification of Letters Patent.  Patented June 15, 1920.

Application filed April 20, 1916. Serial No. 92,356.

*To all whom it may concern:*

Be it known that I, JOSEPH W. ROSCHE, a citizen of the United States, residing at Minneapolis, in the county of Hennepin and State of Minnesota, have invented certain new and useful Improvements in Hydraulic Transmission Mechanism; and 1 do hereby declare the following to be a full, clear, and exact description of the invention, such as will enable others skilled in the art to which it appertains to make and use the same.

My invention has for its object to provide a highly efficient variable speed and reversible hydraulic transmission mechanism adapted for general use, whereby a mechanism of that character is required, but especially serviceable for use in automobiles or motor-propelled vehicles. Generally stated, the invention consists of the novel devices and combinations of devices hereinafter described and defined in the claims.

The transmission mechanism involves a plurality of primary or driving pumps and a plurality of secondary or driven pumps, together with coöperating ports, fluid circulating channels, and coöperating valves. Oil is advisedly used as a fluid medium. The pumps, which, preferably, are of cylinder and piston type, are circumferentially spaced in radial arrangement, the primary or driving pumps being arranged to rotate with the driving members and the secondary or driven pumps being arranged to rotate with the driven member. The driven member is preferably a crank shaft connected to the pistons of the secondary pumps. The pistons of the primary pumps are preferably driven by a non-rotary variable throw eccentric that is arranged for diametrical adjustments in either of two directions from a neutral or concentric position. The valves which control the ports to and from the respective cylinders are so timed that the following results can be obtained, to-wit:

1st. When the variable throw control eccentric is in a neutral position, there will be no movement of the primary pistons within the primary cylinders, and, consequently, no circulation of the oil, and, as a result, no movement of the secondary pistons, so that the driving and driven members will then be locked together and given common rotation at the same speed.

2nd. If the controller eccentric be adjusted in one direction from its neutral position, the primary pumps will circulate the oil, and thereby drive the secondary pumps in a manner which will cause the driven member to rotate faster than the driving member, the excess speed thereof, being in proportion to the amount of oil pumped; and 3rd. If the controller eccentric be adjusted from its neutral position in the opposite direction from that just noted, three results, differing in degree, may be obtained, to-wit:

*a.* The primary pumps will pump oil to the secondary pumps with a differently timed action from that above noted, and will cause the driven member to lag back or be retarded in respect to the primary member.

*b.* When under this latter noted adjustment, the displacement of the primary pumps equalize that of the secondary pumps, the retardation of the driven member will equal that of the forward rotation of the driving member, and the said driven member will then be stationary, or, in other words, will not rotate in either direction.

*c.* If adjustment of the controller eccentric, by way of increased stroke in the direction last described, be further increased so that the displacement of the primary pumps exceeds that of the secondary pumps, then the retardation of the driven member will be further increased with the effect that the said driven member will then be rotated backward, or in a direction reverse to that in which the driving member is rotated.

In this way, a variable speed reversible hydraulic transmission is provided.

This invention is illustrated in the accompanying drawings wherein like characters indicate like parts throughout the several views. Referring to the drawings:

Figure 1 is a vertical section taken axially through the improved hydraulic transmission mechanism;

Fig 2 is a fragmentary view partly in elevation and partly in vertical section, particularly illustrating the means for adjusting the variable throw controlling eccentric;

Fig. 3 is a section on the line $x^3$ $x^3$ of Fig. 2;

Fig. 4 is a vertical section taken on the line $x^4$ $x^4$ of Fig. 1 looking from the right;

Fig. 5 is a vertical section taken on the line $x^5$ $x^5$ of Fig. 1 looking from the right;

Figure 6:
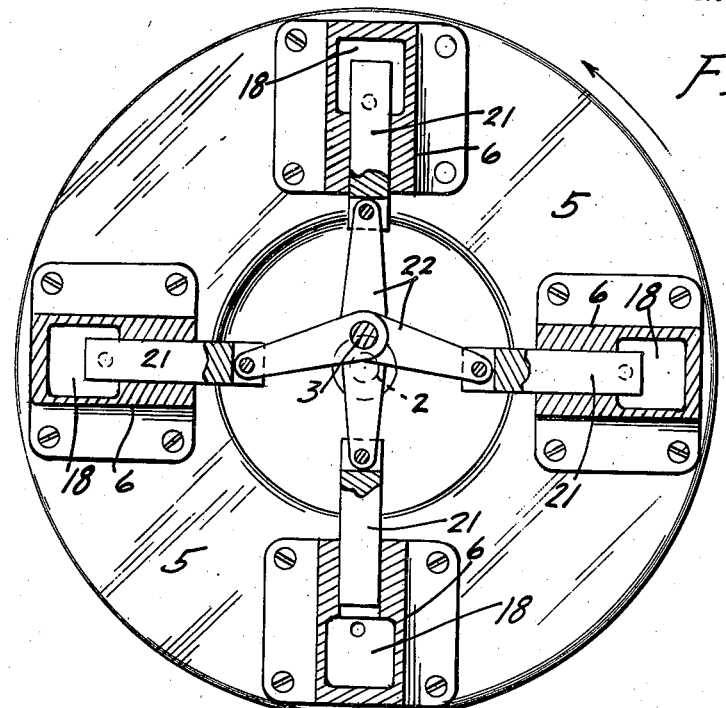
Fig. 6 is a vertical section taken on the line $x^6$ $x^6$ of Fig. 1 looking from the left.

In the preferred arrangement of the transmission illustrated in the drawings, the driving member, which we will assume is connected to, or driven from an engine or motor, is in the form of a shaft 1, and the driven member is in the form of a shaft 2 that is provided with a crank 3. The driving shaft 1 carries a driving head which, as shown, is made up of head plates 4, an intermediate disk-like section 5 and cylindrical blocks 6, all of which parts, 1, 4, 5 and 6, are rigidly connected for common rotation. The shaft 1 is shown as journaled in suitable bearings 7 and the right hand head plate 4, as shown, is journaled on a fixed bearing sleeve 8 rigidly secured to a support 7ª. The inner end of the sleeve 8, as shown, is extended into the central disk-like section 5 of the rotary head or casing so that it affords a bearing therefor. Here it should be noted that the crank shaft 2 is extended through and journaled in the sleeve 8, and at its left hand end, as shown in Fig. 1, is provided with a trunnion-like extension just beyond its crank 3 that is loosely journaled in a seat formed in the end of the driving shaft 1.

Figure 7:
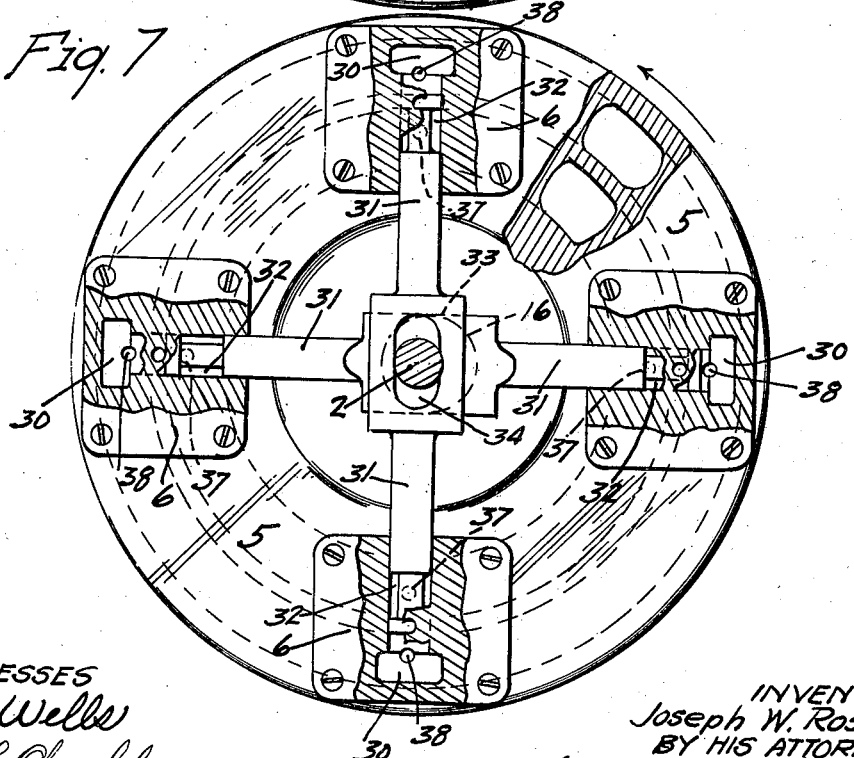
Fig. 7 is a vertical section taken on the line $x^7$ $x^7$ of Fig. 1 looking from the left.

At a point close to the disk-like section 5, the sleeve 8 is provided with a fixed eccentric 9, and mounted for diametrical adjustments on the said sleeve, adjacent to the said eccentric 9, is a reversible variable throw, so-called controller eccentric 10. This variable throw eccentric 10 (see particularly Figs. 2, 3 and 4) has a rectangular diametrically elongated axial passage 11 that fits a reduced squared portion 8ª of the sleeve 8. The elongated passage 11 permits the eccentric 10 to be moved diametrically in either of two directions from a neutral position, that is, from a position in which it is concentric to the axis of the said sleeve 8. Such adjustments of the eccentric 10 may be produced in various ways, but, as shown, is accomplished by keys 12 set flush into grooves 13 in the fixed sleeve 8 and provided with oblique cam flanges 14 that engage corresponding oblique grooves in the said eccentric 10. Common sliding movements may be imparted to the adjusting keys 12, by means of a lever 15 pivoted to the support 7ª and having forked ends pivoted to the outer ends of the sliding keys 12. The eccentric 9 is set ninety degrees to the diametrical line of movement of the controller eccentric 10, and the latter eccentric, by diametrical adjustments, can be set, at will, either ninety degrees ahead, or ninety degrees behind the said eccentric 9, directions being taken in respect to the direction of rotation of the driving shaft 1 and its head 4—6, which direction of rotation should be assumed to be in the direction of the arrows marked on Figs. 4 to 7, inclusive.

The crank shaft 2, adjacent to its crank 3 is provided with an eccentric 16 that is set ninety degrees behind the crank 3, directions being again assumed to be as indicated by the above noted arrows.

The right hand section 6 of the driving head is formed with a multiplicity of radial cylinders 17, as shown, four in number, and the left hand section 6 is formed with a multiplicity of radial cylinders 18, also shown as four in number. The cylinders 18 are of considerably less diameter than the cylinders 17.

Working in the cylinders 17 are pistons 19 pivotally connected to the outer ends of connecting rods 20, the inner ends of which are arranged, side by side, and all mounted on the controller eccentric 10.

Working in the cylinders 18 are pistons 21 pivoted to the outer ends of connecting rods 22, the inner ends of which are arranged, side by side, and all pivoted on the crank 3 of the driven shafts.

The central section 5 of the driving head is formed with two fluid circulating channels 23 and 24. For coöperation with each cylinder 17, the right hand head section 6 is formed with a radial piston valve seat 25 in which works a piston valve 26 having an annular port 27 near its extreme outer end. The diametrically opposite piston valves 26 are rigidly connected or integrally formed and, at their intermediate portions, are provided with parallel laterally offset shoulders 28 (see particularly Figs. 1 and 7), that work against the fixed eccentric 9, and they are also formed with elongated slots 29 that clear the crank shaft 2, so that the latter does not interfere with the reciprocating movements of said valves.

For coöperation with each cylinder 18, the left hand head section 6 is formed with a radial piston valve seat 30 and working in each such seat is a piston valve 31. These piston valves are of the same construction as the valves 26 and are formed near their outer ends with annular ports 32; and the diametrically opposite pistons are rigidly connected and formed with laterally offset parallel shoulders 33, which, in this instance, however, engage the cam 16 of the crank shaft 2. The intermediate portions of these connected valves 31 are provided with elongated slots 34 which clear the shaft 2 so that the latter does not interfere with the movements of the said valves 31 (see Fig. 7).

The fluid channels 24 and 23 are connected to the piston seats 25, respectively, by ports 35 and 36, and the said channels 24 and 23 are likewise connected to the piston valve seats 30, respectively, by ports 37 and 38.

*Operation.*

In the operation now to be described, it will be noted that the coöperating cylinders and pistons 17 and 19, operate as primary or driving pumps, and that the coöperating cylinders and pistons 18 and 21, coöperate as secondary or driven pumps. As a first illustration, assume that the controller eccentric 10 is moved to its neutral or concentric position, so that the primary pistons 19, under rotation of the driving shaft 1 and its driving head which carries the cylinders, will not be reciprocated, and, consequently, there will be no movement of the oil in the various ports, channels, cylinders and piston seats, and hence, there will be no movement of the secondary pistons 21, and the latter will be locked against reciprocation. Obviously, when the pistons 21 cannot reciprocate, the crank shaft cannot move in respect to the driving shaft, and hence, must rotate therewith at the same speed. Otherwise stated, when the said eccentric 10 is in its neutral position, there will be a common rotation of all of the elements that make up the transmission mechanism and there will be no relative movement of any one part, in respect to the other. This, of course, is an ideal condition for ordinary or normal transmission power and is especially desirable when the mechanism is used in automobile construction.

When the controller eccentric 10 is adjusted radially downward, in respect to Fig. 4, for example, it will be set ninety degrees ahead of the coöperating stationary eccentric 9, in the direction of the rotation of the driving shaft and its head, and under such adjustment, the primary pistons 19 will be reciprocated in the cylinders 17, and the timing of the valves 26 will be such that the oil will be admitted from the outer channel 23 into the cylinders 17, while the pistons 19 are making their inner stroke, and will be delivered from said cylinders 17 to the inner channel 24, while said pistons are making their outer strokes. Furthermore, the timing of the valves 31, in respect to the pistons 21, is such that under the above stated conditions, oil delivered into the inner channel 24 from the primary pumps will be delivered into the cylinders 18, while the pistons 21 are near their outer position and while they are making their inner stroke, and the oil from said cylinders 18 will be delivered to the outer channel 23 while the said pistons 21 are making their outer stroke. This timing is due to the fact that the controller eccentric 10 is set ahead of the coöperating eccentric 9 while the crank 3 of the driven shaft 2 is also set ahead of its coöperating eccentric 16 on the driven shaft 2. Under such adjustment the driven shaft 2 will be rotated at a speed in excess of that of the driving shaft and its excess in speed over that of the driving shaft will be in proportion to the amount of oil pumped by the primary pumps in excess of that taken by the secondary pumps. Obviously, this adjustment may be infinitesimally regulated by radial adjustments of the said controller eccentric 10.

When the eccentric 10 is raised above its neutral position, it will then be set back of its coöperating cam 9 in the direction of the rotation of the driving shaft, and, under these conditions, the valve 26 will be timed to connect the inner oil channel 24 to the cylinders 17, while the pistons 19 are making their inner stroke and to connect said cylinders to the outer oil channel 23, while said pistons are making their outer strokes. Furthermore, at this time, or under such adjustment, the inner oil channel 24 will be connected to the cylinders 18 while the pistons 21 are making their outer strokes, and while the said inner channel 24 is also connected to the cylinders 17, and the said outer oil channel 23 will be connected to said cylinders 18 while said pistons 21 are making their inner strokes and while the pistons 19 are making their outer strokes. Under this latter noted adjustment, the crank shaft will be moved slower than the driving shaft and the greater amount of oil pumped by the primary pumps 17 and 19, the greater will be the retardation of the crank shaft 2 in respect to the driving shaft. When the controller eccentric 10 is thus adjusted in the direction last assumed, to a point where the displacement of the primary pistons 19 equalize that of the secondary pistons 21, the crank shaft 2 will reach a back lag equal to that of the rotation of the crank shaft, and, consequently, will remain stationary. If this same adjustment of the controller cam 10 in the same direction be then increased, so that the pistons 19 produce greater displacement than the pistons 21, then the said crank shaft will be given a further retarded motion, in respect to the driving shaft, or, in other words, will actually be rotated in a direction reverse to that of the crank shaft, thus providing means for effecting a reverse or back drive.

For convenience of statement, the member which carries the cylinders of the primary and secondary pumps is, in the specification and in the claims, designated as the driving member, and the crank shaft as the driven member, and this is the best and most desirable arrangement, but, nevertheless, it will be possible to utilize the crank shaft as the driving member and the member carrying the said cylinders as the driven member, and such reverse construction, as is obvious, would be within the scope of my invention and within the scope of the claims. Also, because of the possibility of thus reversing the said operation, both sets of cylinders and pistons are herein designated as "pumps".

What I claim is:

1. In a hydraulic transmission, the combination, of a rotary casing, primary and secondary pump cylinders with communicating conduits between said cylinders integral with said casing, pistons for said cylinders, means for rotating the casing, a hydraulic transmitting fluid arranged in said cylinders and conduits, means for connecting the secondary pump pistons to a driven shaft, and means to adjust the stroke of the primary pistons to impart a positive or a negative motion to the secondary pistons and driven shaft.

2. In a hydraulic transmission, the combination of a rotary casing, primary and secondary pump cylinders, the primary pump cylinders having greater capacity than the secondary pump cylinders, with communicating conduits between said cylinders, said conduits and cylinders being integral with said casing, and hydraulic transmitting fluid arranged in said cylinders and conduits, means for connecting the secondary pump pistons to a driven shaft, and means to adjust the stroke of the primary piston to impart a positive or negative motion to the secondary pistons and driven shaft.

3. In a hydraulic transmission, the combination with rotary driving and driven members, of primary and secondary pumps rotatable with said driving member, the cylinders of said primary pumps having greater volumetric displacement than the cylinders of said secondary pumps, conduits connecting the cylinders of said primary and secondary pumps, valves controlling said conduits and means for varying the pumping capacity of said primary pumps from an amount that is less to an amount that exceeds the pumping capacity of said secondary pumps.

4. In a hydraulic transmission, the combination with rotary driving and driven members, of primary and secondary pumps rotatable with said driving member, conduits connecting the cylinders of said primary and secondary pumps, valves controlling said conduits, means for varying the pumping capacity of said primary pumps from an amount that is less to an amount that exceeds the pumping capacity of said secondary pumps, and hydraulic means for locking the primary and secondary pumps together for simultaneous rotation.

5. In a hydraulic transmission, the combination with a prime motor, of driving and driven members, one of said members comprising primary and secondary pumps through which the other is driven and rotatable with and non-rotatable relatively to the prime motor, the primary and secondary pumps being in communication one with the other through conduits for the passage of a hydraulic fluid medium for transmission of power from the primary to the secondary pump, valves for controlling the passage of the power transmission fluid through the conduits, eccentrics for timing the movement of said valves and a variable throw member associated with the primary pump adjustable relatively to the valve timing eccentrics for effecting rotation of the driven member at a higher speed than the driving member.

6. In a hydraulic transmission, the combination with a prime motor, of driving and driven members, one of said members comprising primary and secondary pumps through which the other is driven and rotatable with and non-rotatable relatively to the prime motor, the primary and secondary pumps being in communication one with the other through conduits for the passage of a hydraulic fluid medium for transmission of power from the primary to the secondary pump, valves for controlling the passage of the power transmission fluid through the conduits, eccentrics for timing the movement of said valves and a variable throw member associated with the primary pump and adjustable relatively to the valve timing eccentrics for effecting rotation of the driven member at a lower speed than the driving member.

7. In a hydraulic transmission, the combination with a prime motor, of driving and driven members, one of said members comprising primary and secondary pumps through which the other is driven and rotatable with and non-rotatable relatively to the prime motor, the primary and secondary pumps being in communication one with the other through conduits for the passage of a hydraulic fluid medium for transmission of power from the primary to the secondary pump, valves for controlling the passage of the power transmission fluid through the conduits, eccentrics for timing the movement of the valves and a variable throw member associated with the primary pump and adjustable relatively to the valve timing eccentrics for effecting change of direction of rotation of the driven member.

8. In a hydraulic transmission, the combination with a prime motor, of driving and driven members, one of said members comprising primary and secondary pumps through which the other is driven and rotatable with and non-rotatable relatively to the prime motor, the primary and secondary pumps being in communication one with the other through conduits for the passage of a hydraulic fluid medium for transmission of power from the primary to the secondary pump, valves for controlling the passage of the power transmission fluid through the conduits, a variable throw member associated with the primary pump, and means for shifting said variable throw member to gradually accelerate or retard the speed of rotation of the driven member above or below the speed of the driving member and also reverse the direction of rotation of the driven member.

9. In a hydraulic transmission, the combination with a prime motor shaft, of sets of cylinders connected to rotate together and provided with pistons and connected to the prime motor shaft to be rotatable therewith and non-rotatable relatively thereto, an interior driven shaft connected to the pistons of one set of cylinders, the two sets of cylinders being in communication one with the other through conduits for the passage of a fluid transmission medium for transmission of power from one set of pistons to the other set, eccentric actuated valves for controlling the direction of flow of the power transmission fluid, and an eccentric associated with the pistons of one set of cylinders and adjustable relatively to the valve actuating eccentrics to cause both sets of said pistons to remain stationary when the driving and the driven shafts rotate at the same speed.

10. In a hydraulic transmission, the combination with a prime motor shaft, of sets of cylinders connected to rotate together and provided with pistons and connected to the prime motor shaft to be rotatable therewith and non-rotatable relatively thereto, a driven shaft with which the pistons of one set of cylinders are connected, the two sets of cylinders being in communication one set with the other through conduits for the passage of a hydraulic fluid power transmission medium into both sets of cylinders to work between their heads and the pistons for transmitting power from one set of cylinders to the other, eccentric actuated valves for controlling the direction of flow of the power transmission fluid, and an eccentric associated with the pistons of one set of cylinders and adjustable relatively to the valve actuating eccentrics to equalize the displacement of fluid between the two sets of cylinders and stop the rotation of the driven member.

11. In a hydraulic transmission, the combination with a prime motor shaft and a driven shaft, of primary and secondary cylinders connected to rotate together and provided with pistons and connected to the prime motor shaft to be rotatable therewith, the primary cylinders being of larger capacity than the secondary cylinders and the pistons of the secondary cylinders connected to the driven shaft, the two sets of cylinders being in communication one set with the other through conduits for the passage of a hydraulic fluid power-transmission medium into both sets of cylinders to work between their heads and the pistons for transmitting power from one set of cylinders to the other, and means for varying the throw of the pistons of the primary cylinders to rotate the driven shaft beyond the speed of the prime motor shaft.

12. In a hydraulic transmission, the combination with a prime motor shaft and a driven shaft, of primary and secondary cylinders connected to rotate together and provided with pistons and connected to the prime motor shaft to be rotatable therewith, the primary cylinders being of larger capacity than the secondary cylinders and the pistons of the secondary cylinders connected to the driven shaft, the two sets of cylinders being in communication one set with the other through conduits for the passage of a hydraulic fluid power-transmission medium into both sets of cylinders to work between their heads and the pistons for transmitting power from one set of cylinders to the other, and means for varying the throw of the pistons in the primary cylinders to reverse the direction of rotation of the driven shaft up to a predetermined point.

13. In a hydraulic transmission, the combination with a prime motor shaft and a driven shaft, of primary and secondary cylinders connected to rotate together and provided with pistons and connected to the prime motor shaft to be rotatable therewith, the primary cylinders being of larger capacity than the secondary cylinders and the pistons of the secondary cylinders connected to the driven shaft, the two sets of cylinders being in communication one set with the other through conduits for the passage of a hydraulic fluid power-transmission medium into both sets of cylinders to work between their heads and the pistons for transmitting power from one set of cylinders to the other, and means for varying the throw of the pistons in the primary cylinders to gradually accelerate or retard the speed of rotation of the driven shaft above or below the speed of the prime motor shaft and also reverse the direction of rotation of the driven shaft.

14. In a hydraulic transmission, the combination with rotary driving and driven members, of primary and secondary pump cylinders connected to rotate with said driving member, primary and secondary pistons working in said primary and secondary cylinders, respectively, a variable stroke non-rotary controller eccentric with connections for operating said primary pistons, a crank carried by said driven member, connections between said crank and said secondary pistons, ports and channels connecting said primary and secondary cylinders, valves controlling the ports to and from said primary cylinders, a non-rotary eccentric operating said valves, other valves controlling the ports to and from said secondary cylinders, and an eccentric carried by said driving member and operating said latter noted valves.

15. In a hydraulic transmission, the combination with rotary driving and driven members, of primary and secondary pump cylinders connected to rotate with said driving member, primary and secondary pistons working in said primary and secondary cylinders, respectively, a variable stroke non-rotary controller eccentric with connections for operating said primary pistons, a crank carried by said driven member, connections between said crank and said secondary pistons, ports and channels connecting said primary and secondary cylinders, valves controlling the ports to and from said primary cylinders, a non-rotary eccentric operating said valves, other valves controlling the ports to and from said secondary cylinders, and an eccentric carried by said driven member and operating said latter noted valves, the eccentric controlling said first noted valves being set approximately at ninety degrees from said controller eccentric, and the eccentric controlling said latter noted valves being set approximately at ninety degrees to the crank on said driven member.

16. In a hydraulic transmission, the combination with rotary driving and driven members, of primary and secondary pumps rotatable with said driving member, the cylinders of said primary pumps having greater diameter than the cylinders of said secondary pumps, conduits connecting the cylinders of said primary and secondary pumps, valve mechanism controlling said conduits, and means for varying the pumping capacity of said primary pumps from an amount that is less to an amount that exceeds the pumping capacity of said secondary pumps.

17. In a hydraulic transmission, the combination with a driving shaft and an axially alined driven shaft having one end journaled therein, of primary and secondary pumps carried by said driving shaft, said secondary pumps having connections for rotating said driven shaft, means for varying the pumping action of said primary pumps, conduits connecting the cylinder of said primary and secondary pumps, and valve mechanism controlling said conduits to cause said primary pumps to drive said secondary pumps.

In testimony whereof I affix my signature in presence of two witnesses.

JOSEPH W. ROSCHE.

Witnesses:
BERNICE G. WHEELER,
HARRY D. KILGORE.